Jan. 28, 1969   E. HENRY-BIABAUD   3,424,502
BRAKING SYSTEM FOR TRACTOR AND TRAILER ASSEMBLY
Filed Aug. 22, 1967

United States Patent Office 3,424,502
Patented Jan. 28, 1969

3,424,502
BRAKING SYSTEM FOR TRACTOR AND
TRAILER ASSEMBLY
Edmond Henry-Biabaud, Paris, France, assignor to
Societe Anonyme Andre Citroen, Paris, France, a
French society
Filed Aug. 22, 1967, Ser. No. 662,424
Claims priority, application France, Sept. 30, 1966,
78,446
U.S. Cl. 303—7                                6 Claims
Int. Cl. B60t *13/58*

ABSTRACT OF THE DISCLOSURE

This disclosure describes a braking system for a tractor and trailer assembly in which the tractor brakes are hydraulically operated whilst the trailer brakes are pneumatically operated. To this end, the tractor includes sources of compressed air and pressurised liquid, a two-channel pneumatic distributor which supplies compressed air from the appropriate source to its two channels in response to actuation of the brake pedal of the tractor, and a two-channel hydraulic distributor which supplies pressurised liquid to its two channels in response to operation of a pneumatic actuator controlling the hydraulic distributor. One of the channels of the pneumatic distributor is provided with a detachable connector for connecting the channel to the pneumatic brake system of the trailer and its other channel is connected to the pneumatic actuator controlling the hydraulic distributor. The two channels of the latter are respectively connected to hydraulic brake actuators for operating the front and rear brakes of the tractor.

---

Trailers or articulated trailers coupled to tractors are generally braked by pneumatic jacks or actuators controlled by a pipeline connected to a source of compressed air disposed on the tractor. This arrangement is generally preferred to a hydraulic braking system owing to the necessity of having a detachable connection in the control pipeline between the tractor and the trailer.

It is known that hydraulic braking systems for motor vehicles have advantages over pneumatic systems but, particularly for the reason which has just been given, a trailer has never been successfully driven by a tractor vehicle equipped with a hydraulic braking system.

Finally, it must be remembered that highway safety regulations require that a trailer be braked before the tractor vehicle.

The invention has for an object to provide a braking system for a tractor and trailer assembly which utilises both the advantages of pneumatic braking of the trailer and hydraulic braking of the tractor, whilst making it possible to satisfy the requirements of highway safety regulations.

The invention provides a braking system for a tractor and trailer assembly, wherein the tractor includes a source of compressed air and a two-channel distributor supplied by said source and arranged to be mechanically actuated by the brake pedal, one of said channels being connectable to the actuators for braking the axle or axles of the trailer, and the other channel being connected to an actuator controlling a hydraulic distributor which also has two channels and is supplied by a source of pressurised liquid, the two channels of said hydraulic distributor being respectively connected to the brake actuators of the tractor.

Figure 1:
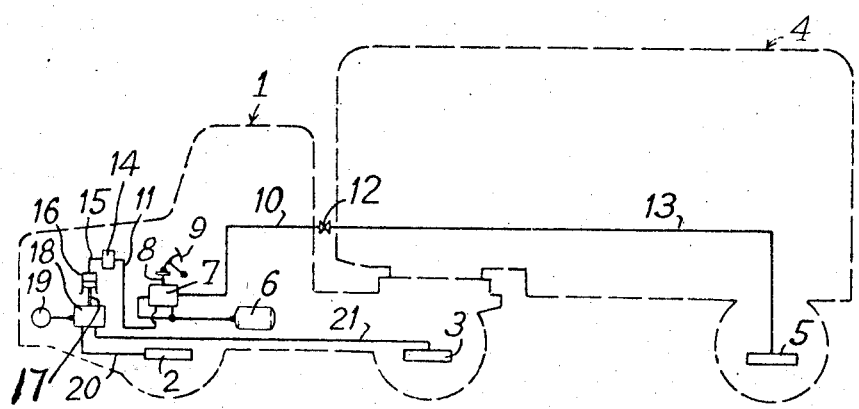
Figure 2:
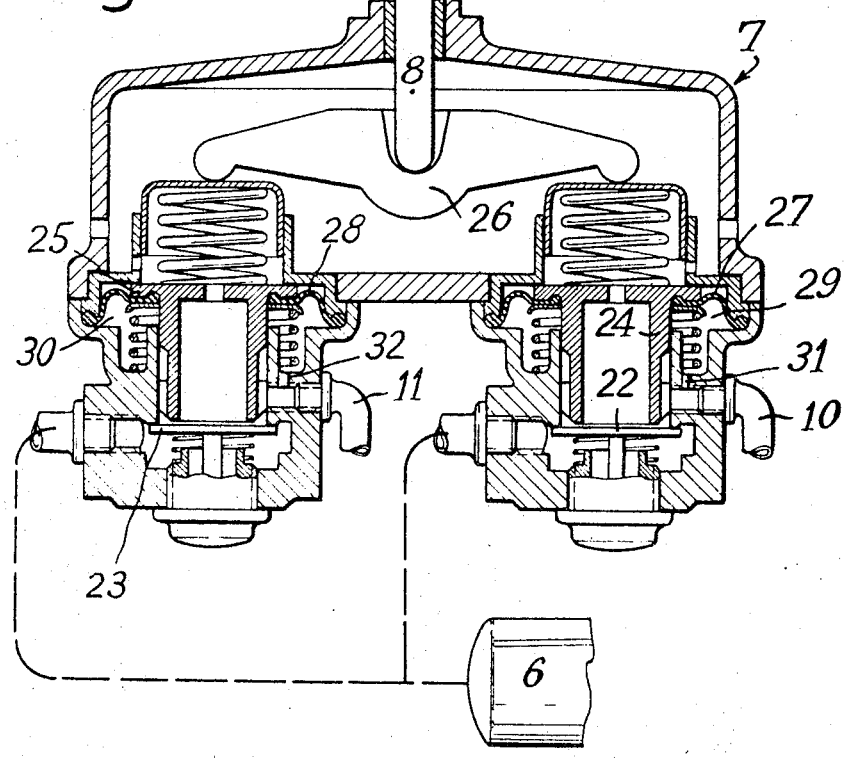

In order that the present invention may be more readily understood, reference will now be made to the accompanying drawings, in which:

FIGURE 1 is a diagram illustrating a braking system according to the invention, and FIGURE 2 is a partial sectional view through a pneumatic distributor for use in a system according to the invention.

Referring to the drawings, 1 is a tractor the axles of which are provided with brake actuators 2 and 3. An articulated trailer 4 is coupled to the tractor and its rear wheels have brake actuators 5.

A tank 6 containing pressurised air supplies a pneumatic distributor 7, the control member 8 of which is actuated by the brake pedal 9. This distributor comprises two channels 10 and 11, the first being connected by means of a detachable connection 12 to a pipeline 13 supplying the actuators 5 either directly, as shown in FIGURE 1, or via a control valve.

The second channel 11 includes an accumulator device 14, whose role and preferred dimensions will be specified later. A pipeline 15 extends from this accumulator and supplies the cylinder of the actuator 16. The piston rod 17 of the latter constitutes the control member of a hydraulic distributor 18 supplied by a tank 19 containing pressurised liquid.

The distributor 18 also comprises two channels 20 and 21 which respectively feed the actuators 2 and 3 of the brakes of the tractor. This distributor may be of a type similar to that forming the subject of our French Patent No. 1,121,624. In fact, it permits automatic adjustment of the braking as a function of the load supported by the axles, this being particularly useful when it is a question of a tractor which may be coupled to an articulated trailer. In this case, the piston rod 17 could purely and simply replace the pedal 23 described in that patent.

The operation of the braking system is then as follows. When the driver of the tractor presses the pedal 9, the compressed air is sent directly to the brake actuators 5 of the trailer as well as into the accumulator 14. The latter constitutes to some extent a buffer balloon making it possible to re-establish on the tractor the possibility of controlling the braking action. It is known, in fact, that in a braking system which is entirely pneumatic the braking is controlled by the length of stroke of the brake pedal, whilst in an assisted hydraulic braking system, this control is effected by the pressure exerted on the pedal by the operator. In the system according to the invention, it is therefore advantageous artificially to re-establish in the hydraulic circuit the possibility of control as a function of the length of stroke of the pedal because in the particular case of the distributor described in the above mentioned patent, this posibility does not exist. To this end, the volume of the accumulator 14 will be determined as a function of the relative characteristics of the braking circuits of the tractor and the trailer. However, it has been found that it is sufficient, in the majority of practical cases, that the volume of the accumulator 14, or more generally of the circuit 11, 14, 16, be a noticeable fraction of the volume of the circuit 10, 13, 15, of the trailer, this fraction preferably being between 10 and 30%.

It must in addition be noted that this accumulator also contributes to increasing the natural time constant of the brake circuit of the tractor in order that the actuators 5 always operate before the actuators 2 and 3.

When the compressed air operates the control actuator 16, the hydraulic fluid contained in the source 19 supplies the actuators 2 and 3, thus effecting braking of the tractor according to a law which, as has been said, may be a function of the load on the axles.

Referring to FIGURE 2, an advantageous form of the pneumatic distributor will now be described which also contributes, in conjunction wtih the accumulator 14, on the one hand, to re-establishing control of the braking on the tractor as a function of the length of stroke of the pedal 9 and, on the other hand, to ensuring delay of the braking on the tractor.

The pneumatic distributor 7 comprises, in each of the channels 10 and 11, valves 22, 23 closing the compressed air inlet pipe. These valves may be actuated downwardly by the control member 8 via plungers 24 and 25 which depend from a compensator 26. The plungers 24 and 25 are securely fixed to membranes 27 and 28 defining closed spaces 29 and 30 which communicate with the two channels 10 and 11 respectively through orifices 31 and 32.

It is necessary to apply a resistant stress to the member 8 in order to give the operator, who is controlling the braking, a suitable physiological sensation. This is the precise role of the orifices 31 and 32 which enable an upward stress, proportional to the pressures prevailing respectively in each of the channels 10 and 11, to be applied to the plungers 24 and 25, by means of the membranes 27 and 28.

In accordance with the invention, the orifices 31 and 32 are carefully calibrated so as to contribute to the shift in time of the braking action on the different axles. The orifice 31 has a smaller section than the orifice 32, preferably 3 to 20 times smaller. Thus, the effect of the operator depressing the member 8 is a more rapid inlet of air into the channel 10 of the braking circuit of the trailer, since the plunger 24 is subjected much later than the plunger 25 to the action of the pressure on the membranes 27 and 28 which are associated respectively therewith. In other words, for a given depression of the member 8, the rocking of the compensator 26 under the action of the pressure in the chamber 30 holds the valve 22 in a position which is more open than the valve 23, thus favouring transmission of compressed air into the braking circuit of the trailer.

The same effect could moreover be achieved by providing a carefully calibrated spray nozzle in the pipeline 11 or, more generally, by using a pipeline 11 having a diameter smaller than that of the pipeline 10.

Moreover, the measurement of the pressure in the actuator 16 may be re-established owing to a valve 23 having a smaller section than the valve 22.

I claim:

1. In a tractor for a tractor and trailer assembly, a braking system comprising a source of compressed air, a first two-channel pneumatic distributor connected to said compressed air source for receiving compressed air therefrom, a brake pedal, means operatively connecting the brake pedal to said pneumatic distributor for controlling the distribution of compressed air to said two channels, means for connecting a first one of said channels to the brake system of the trailer, an independent source of pressurised hydraulic brake liquid a second, separate multi-channel hydraulic distributor connected to said source of pressurised liquid for receiving pressurised liquid therefrom and distributing it to said channels of said hydraulic distributor, a pneumatic actuator adapted to control said hydraulic distributor means connecting the second one of said channels of said pneumatic distributor to said pneumatic actuator, and hydraulic actuator means adapted to operate the brakes of said tractor, said channels of said hydraulic distributor being connected to said hydraulic actuator means.

2. The braking system claimed in claim 1, wherein the means connecting said second channel of said pneumatic distributor to said pneumatic actuator includes a pneumatic accumulator.

3. The braking system claimed in claim 2, wherein the volume of said accumulator is between 10 and 30% of the volume of the pneumatic circuit of the trailer brake system.

4. The braking system claimed in claim 1, wherein said pneumatic distributor includes two valve means controlling the supply of compressed air from said compressed air source to said two channels of said pneumatic distributor, means operatively coupling said brake pedal to said valve means and adapted to open said valve means in response to actuation of said brake pedal, pneumatically operated means associated respectively with said valve means for resisting opening of said valve means, two calibrated orifices respectively connecting said pneumatically-operated means to said two channels for applying air pressure to said pneumatically-operated means in response to opening of said valve means, said orifice connecting with said first channel of said pneumatic distributor having a smaller cross-section than said other orifice.

5. The brake system claimed in claim 4, wherein said orifice connecting with said first channel has a cross-section 3 to 20 times smaller than the cross-section of said other orifice.

6. The brake system claimed in claim 1, including two hydraulic actuator means adapted respectively to operate front and rear brakes of the tractor, said hydraulic distributor including two channels connected respectively to said two hydraulic actuator means.

References Cited

UNITED STATES PATENTS 2,248,435  7/1941  Pleines _____ 303—8
2,275,255  3/1942  Freeman _____ 303—8

MILTON BUCHLER, *Primary Examiner.*

J. J. McLAUGHLIN, *Assistant Examiner.*

U.S. Cl. X.R.

303—2, 53